(12) United States Patent
Yanagawa et al.

(10) Patent No.: US 11,571,769 B2
(45) Date of Patent: Feb. 7, 2023

(54) METHOD OF MANUFACTURING A BRAZING SHEET

(71) Applicant: UACJ Corporation, Tokyo (JP)

(72) Inventors: Yutaka Yanagawa, Aichi (JP); Tatsuya Ide, Aichi (JP); Taichi Suzuki, Aichi (JP); Tomoki Yamayoshi, Aichi (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 17/268,283

(22) PCT Filed: Sep. 5, 2019

(86) PCT No.: PCT/JP2019/034923
§ 371 (c)(1),
(2) Date: Feb. 12, 2021

(87) PCT Pub. No.: WO2020/054564
PCT Pub. Date: Mar. 19, 2020

(65) Prior Publication Data
US 2021/0213568 A1     Jul. 15, 2021

(30) Foreign Application Priority Data

Sep. 11, 2018  (JP) .............................. JP2018-169625

(51) Int. Cl.
*B32B 15/01*     (2006.01)
*B23K 35/02*     (2006.01)
(Continued)

(52) U.S. Cl.
CPC ........ *B23K 35/0238* (2013.01); *B23K 20/023* (2013.01); *B23K 35/288* (2013.01);
(Continued)

(58) Field of Classification Search
None
See application file for complete search history.

(56) References Cited

U.S. PATENT DOCUMENTS 6,896,977 B2    5/2005   Nishimura et al.
7,926,701 B2    4/2011   Dulac et al.
(Continued)

FOREIGN PATENT DOCUMENTS

CN    1298205 A    6/2001
CN    1416377 A    5/2003
(Continued)

OTHER PUBLICATIONS

English translation of the International Search Report dated Dec. 10, 2019 for parent application No. PCT/JP2019/034923.
(Continued)

*Primary Examiner* — Daniel J. Schleis
(74) *Attorney, Agent, or Firm* — J-Tek Law PLLC; Jeffrey D. Tekanic; Scott T. Wakeman

(57) ABSTRACT

In a brazing sheet manufacturing method, a cladding slab is prepared by overlaying at least a core-material slab composed of an aluminum material and a filler-material slab composed of an Al—Si series alloy, in which a metal element that oxidizes more readily than Al is included in at least one of the slabs. A clad sheet is prepared by hot rolling this cladding slab, which then has at least a core material layer composed of the core-material slab and a filler material layer composed of the filler-material slab and disposed on at least one side of the core material. Then, a surface of the clad sheet is etched using a liquid etchant that contains an acid. Subsequently, the clad sheet is cold rolled to a desired thickness. In flux-free brazing, such a brazing sheet is capable of curtailing degradation in brazeability caused by fluctuations in dew point and oxygen concentration.

16 Claims, 1 Drawing Sheet

(51) Int. Cl.
  *B23K 20/02*  (2006.01)
  *B23K 35/28*  (2006.01)
  *C22C 21/02*  (2006.01)
  *C23F 1/20*   (2006.01)

(52) U.S. Cl.
  CPC ............ *B32B 15/016* (2013.01); *C22C 21/02*
              (2013.01); *C23F 1/20* (2013.01)

(56) References Cited

U.S. PATENT DOCUMENTS

| | | |
|---|---|---|
| 8,247,083 B2 | 8/2012 | Izumi et al. |
| 8,413,876 B2 | 4/2013 | Dulac et al. |
| 10,661,395 B2 | 5/2020 | Ichikawa et al. |
| 10,773,325 B2 | 9/2020 | Eckhard et al. |
| 2004/0238605 A1 | 12/2004 | Nishimura et al. |
| 2007/0158386 A1 | 7/2007 | Dulac et al. |
| 2011/0198392 A1 | 8/2011 | Wittebrood |
| 2014/0315042 A1 | 10/2014 | Suzuki |
| 2014/0329109 A1 | 11/2014 | Takewaka et al. |
| 2015/0165564 A1 | 6/2015 | Ahl et al. |
| 2016/0325367 A1 | 11/2016 | Eckhard et al. |
| 2017/0151637 A1 | 6/2017 | Ichikawa et al. |
| 2017/0282271 A1 | 10/2017 | Itoh et al. |
| 2018/0133845 A1 | 5/2018 | Itoh et al. |
| 2018/0169797 A1 | 6/2018 | Izumi et al. |
| 2018/0214964 A1 | 8/2018 | Itoh et al. |
| 2018/0282843 A1 | 10/2018 | Hasegawa et al. |
| 2019/0151973 A1* | 5/2019 | Itoh ............... B23K 35/286 |
| 2019/0291218 A1 | 9/2019 | Itoh et al. |
| 2019/0314916 A1 | 10/2019 | Itoh et al. |
| 2019/0337074 A1 | 11/2019 | Miyake |
| 2020/0061758 A1* | 2/2020 | Itoh ............... C23F 13/14 |
| 2020/0338671 A1 | 10/2020 | Itoh |

FOREIGN PATENT DOCUMENTS

| | | |
|---|---|---|
| CN | 1561278 A | 1/2005 |
| CN | 1572407 A | 2/2005 |
| CN | 1831171 A | 9/2006 |
| CN | 1886527 A | 12/2006 |
| CN | 101469960 A | 7/2009 |
| CN | 101871062 A | 10/2010 |
| CN | 102003841 A | 4/2011 |
| CN | 102205676 A | 10/2011 |
| CN | 102209629 A | 10/2011 |
| CN | 102251155 A | 11/2011 |
| CN | 102803891 A | 11/2012 |
| CN | 103097850 A | 5/2013 |
| CN | 104039497 A | 9/2014 |
| CN | 104080934 A | 10/2014 |
| CN | 104249224 A | 12/2014 |
| CN | 106661677 A | 5/2017 |
| CN | 108202188 A | 6/2018 |
| CN | 108431260 A | 8/2018 |
| DE | 19744734 A1 | 4/1999 |
| DE | 102008009695 A1 | 9/2008 |
| DE | 202012003090 U1 | 4/2012 |
| DE | 102012200828 A1 | 8/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| EP | 2848354 A1 | 3/2015 |
| EP | 3176273 A1 | 6/2017 |
| JP | S61293699 | 12/1986 |
| JP | H01225736 A | 9/1989 |
| JP | H03124394 A | 5/1991 |
| JP | H03226396 A | 10/1991 |
| JP | H04100696 A | 4/1992 |
| JP | H0525576 A | 2/1993 |
| JP | H0778869 B2 | 8/1995 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H10180489 A | 7/1998 |
| JP | H11183085 A | 7/1999 |
| JP | H11221696 A | 8/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 3160099 B2 | 4/2001 |
| JP | 3212927 B2 | 9/2001 |
| JP | 2002079370 A | 3/2002 |
| JP | 2002161323 A | 6/2002 |
| JP | 2002267882 A | 9/2002 |
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2004084060 A | 3/2004 |
| JP | 2004330233 A | 11/2004 |
| JP | 2005060790 A | 3/2005 |
| JP | 2005523163 A | 8/2005 |
| JP | 2005256166 A | 9/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007031730 A | 2/2007 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008006480 A | 1/2008 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |
| JP | 2010247209 A | 11/2010 |
| JP | 2010255014 A | 11/2010 |
| JP | 2011000614 A | 1/2011 |
| JP | 2011136358 A | 7/2011 |
| JP | 2011247459 A | 12/2011 |
| JP | 2012067994 A | 4/2012 |
| JP | 2013189659 A | 9/2013 |
| JP | 2013233552 A | 11/2013 |
| JP | 2014050861 A | 3/2014 |
| JP | 2014083570 A | 5/2014 |
| JP | 2014155955 A | 8/2014 |
| JP | 2014217844 A | 11/2014 |
| JP | 2014226704 A | 12/2014 |
| JP | 2015030861 A | 2/2015 |
| JP | 2015528852 A | 10/2015 |
| JP | 6055573 B1 | 12/2016 |
| JP | 2017505231 A | 2/2017 |
| JP | 2017119292 * | 7/2017 |
| JP | 2018001266 A | 1/2018 |
| WO | 2017115597 A1 | 7/2017 |

(56) References Cited

FOREIGN PATENT DOCUMENTS

WO        2018100793 A1    6/2018
WO    WO-2018100793 A1 *   6/2018   ......... B23K 35/0233

OTHER PUBLICATIONS

English translation of the Written Opinion for parent application No. PCT/JP2019/034923.
Office Action and Search Report from the Chinese Patent Office dispatched Mar. 18, 2022, in counterpart Chinese application No. 201980050068.1, and translation thereof.
Zuo Guo, Yin, "Theory and Technology of Preparation of Layered Metal Composite Materials"; pp. 303-304; Publisher: Northeastern University Press Northeastern University Press, Dec. 2013, Shenshen City, China; ISBN 978-7-5517-0523-3, and translation thereof.
Office Action and Search Report from the Chinese Patent Office dispatched Sep. 9, 2022 in counterpart Chinese application No. 201980050068.1, and translation thereof.

* cited by examiner

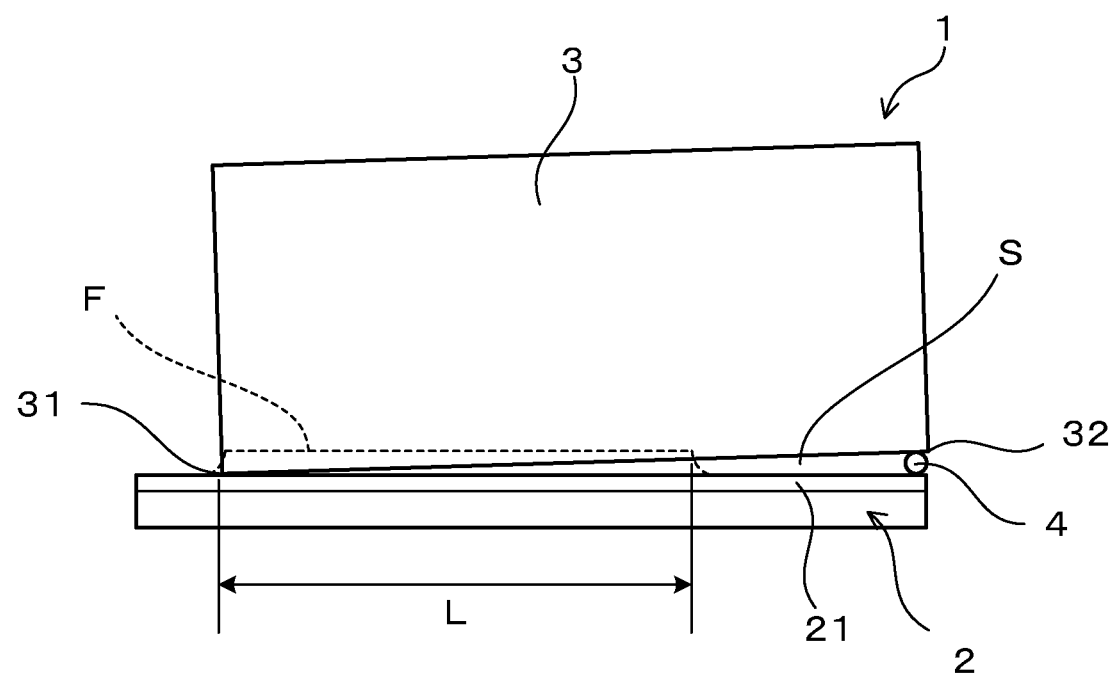

METHOD OF MANUFACTURING A BRAZING SHEET

CROSS-REFERENCE

This application is the US national stage of International Patent Application No. PCT/JP2019/034923 filed on Sep. 5, 2019, which claims priority to Japanese Patent Application No. 2018-169625 filed on Sep. 11, 2018.

TECHNICAL FIELD

The present invention relates to a method of manufacturing a brazing sheet.

BACKGROUND ART

Aluminum products, such as heat exchangers, mechanical parts, and the like, have numerous components composed of aluminum materials (which include aluminum and aluminum alloys; likewise, below). It is often the case that these components are brazed using a brazing sheet that has a core material and a filler material, which is provided on at least one surface of the core material. The core material of the brazing sheet is typically composed of an aluminum alloy whose solidus temperature is 620° C. or higher. In addition, the filler material is composed of an Al—Si alloy whose solidus temperature is approximately 577° C.

A flux-brazing method is often used as a method of brazing an aluminum material, in which brazing is performed by applying a flux to the surfaces of portions to be joined, i.e., the surfaces of a portions that are to be joined by brazing. However, in flux-brazing methods, after the brazing has been completed, flux and the residue thereof adhere to the surface of the aluminum product. The flux, the residue thereof, or the like may cause problems depending on the intended use of the aluminum product. Furthermore, to remove the flux, the residue thereof, and the like, it is necessary to perform an acid-washing process, and the cost of such a process has been viewed as a problem in recent years.

To avoid the above-described problems attendant with the use of flux, depending on the intended usage of the aluminum product, so-called vacuum-brazing methods are also used, in which brazing is performed in a vacuum without the application of flux to the surfaces of the portion to be joined. However, vacuum-brazing methods have the problems in that productivity is lower than in flux-brazing methods and the quality of the brazed joint(s) tends to deteriorate. In addition, the equipment cost, the maintenance cost, and the like are higher in brazing furnaces used in vacuum-brazing methods than in standard brazing furnaces.

Accordingly, so-called flux-free-brazing methods have been proposed, in which brazing is performed in an inert-gas atmosphere without the application of flux to the surfaces of the portion to be joined. In flux-free brazing, brazing of aluminum materials is performed utilizing an effect that breaks down an oxide film, in which a metal element, such as Mg, Li, etc., that is more readily oxidized than Al is present at the surface of the brazing sheet or of the opposing material. Consequently, brazing sheets used in flux-free brazing comprise a core material and a filler material that contains such a metal element.

However, with regard to such a metal element, because the effect of breaking down the oxide film is weaker than that of flux, if the dew point and the oxygen concentration of the atmosphere inside the brazing furnace rise, then the breakdown of the oxide film by Mg, etc. will tend to become insufficient. Consequently, in flux-free brazing, it is necessary to lower the dew point and the oxygen concentration inside the brazing furnace more than in flux brazing.

Incidentally, for various reasons, the dew point and the oxygen concentration of the atmosphere inside the brazing furnace may vary from the dew point and the oxygen concentration of the inert gas that is supplied into the brazing furnace. For this reason, in the situation in which flux-free brazing is performed, there is a problem in that brazeability tends to degrade due to fluctuations in the dew point and the oxygen concentration inside the brazing furnace.

In response to such problems, brazing-sheet manufacturing methods have been proposed (e.g., Patent Documents 1-3) in which, after a brazing sheet has been prepared, etching is performed to remove the oxide film present on the surface.

PRIOR ART LITERATURE

Patent Documents

Patent Document 1
Japanese Laid-open Patent Publication H10-180489
Patent Document 2
Japanese Laid-open Patent Publication 2015-30861
Patent Document 3
Japanese Laid-open Patent Translation No. 2017-505231

SUMMARY OF THE INVENTION

The manufacturing methods described in Patent Documents 1-3 aim to improve brazeability in flux-free brazing by using etching to remove the oxide film present on the surface of the brazing sheet. However, aluminum easily oxidizes when it contacts oxygen, etc. in the air. Consequently, after etching has been completed, an oxide film once again forms on the surface of the brazing sheet due to the exposure of the brazing sheet to the air while cleaning with a liquid etchant and drying are being performed.

For this reason, it is difficult to completely remove the oxide film from the surface of the brazing sheet by using the manufacturing methods described in Patent Documents 1-3. In addition, because oxide film remains on the surface of the brazing sheet, there are situations in which, even if such a brazing sheet is used, brazeability degrades due to fluctuations in the dew point and the oxygen concentration.

The present invention was conceived considering such a background, and an object of the present invention is to provide a method of manufacturing a brazing sheet that can curtail, in flux-free brazing, degradation in brazeability caused by fluctuations in the dew point and the oxygen concentration.

One aspect of the present invention is method of manufacturing a brazing-sheet for brazing an aluminum material in an inert-gas atmosphere without the use of flux, comprising:

preparing a cladding slab by overlaying a plurality of aluminum slabs that includes a core-material slab composed of an aluminum material and a filler-material slab composed of an Al—Si series alloy, in which a metal element that oxidizes more readily than Al is included in at least one of the slabs;

preparing a clad sheet, which comprises a core material composed of the core-material slab and a filler material composed of the filler-material slab and disposed on at least one side of the core material, by hot rolling the cladding slab;

etching a surface of the clad sheet using a liquid etchant that contains an acid; and subsequently cold rolling the clad sheet to a desired thickness.

As will be clear from the working examples described below, the brazing sheet obtained by the above-mentioned manufacturing method exhibits excellent effects and results. It is assumed that these excellent effects and results occur due to the following mechanism.

That is, in the method of manufacturing the brazing sheet, after a clad sheet, which comprises a core material and a filler material disposed on at least one side of the core material, has been prepared, a surface of the clad sheet is etched using a liquid etchant that contains an acid. Thereby, once a comparatively thick oxide film that accumulated on the surface of the filler material due to hot rolling, etc. has been removed, thereafter a new oxide film is regenerated upon contact with air, but the thickness of that oxide film is smaller than before the etching, and therefore has been made fragile.

Furthermore, after etching, the clad sheet is cold rolled to the desired thickness. Therefore, the oxide film on the surface of the filler material that was made fragile by the etching can be fragmented into a plurality of oxide film fragments. Even though a new oxide film then forms along the borders of the fragments of the fragmented oxide film (more particularly, in the gaps between the oxide film fragments) after the newly created surfaces are exposed, the new oxide film will be more fragile than the oxide film fragments owing to the fact that the new oxide film has a thickness less than or equal to at least that of the fragments. That is, on the surface of the filler material that was cold rolled after the etching was performed on the clad sheet, the new oxide film forms such that the fragile oxide film is made of the oxide film fragments formed by the cold rolling, which are connected by fragile border (gap) portions formed by exposure of the portions of the surface between the oxide film fragments.

For this reason, if brazing is performed using such a brazing sheet, then the numerous borders between the fragments become starting points when the filler material has melted, and thereby the breakdown of the oxide film progresses rapidly. As a result, the fluidity of the filler material is improved more than in the past, and thereby degradation in brazeability caused by fluctuations in the dew point and the oxygen concentration can be curtailed more than in existing brazing sheets.

BRIEF DESCRIPTION OF THE DRAWINGS

The sole FIGURE is a side view of a test specimen used in a gap-filling test according to a test example.

DETAILED DESCRIPTION

In the above-mentioned method of manufacturing the brazing sheet, first, a cladding slab is prepared by overlaying a plurality of aluminum slabs that includes a core-material slab and a filler-material slab. By hot rolling this cladding slab, a clad sheet is prepared that comprises a core material and a filler material, which is provided on at least one side of the core material. The layered structure of the clad sheet can assume a variety of configurations. For example, the clad sheet may have a two-layer structure that has a core material and a filler material layered on one side of the core material or may have a three-layer structure comprising a core material and a filler material layered on both surfaces of the core material. In addition, in these layered structures, an intermediate material having a different chemical composition than these layers can also be provided between the core material and the filler material.

Furthermore, it is also possible to layer the filler material on one surface of the core material and to layer, on the other surface, a layer having a chemical composition that differs from that of the core material and the filler material. As an example of such a layer, there is, for example, a sacrificial-anode material composed of an aluminum alloy whose natural electrode potential is lower than that of the core material.

At least one slab among the plurality of aluminum slabs that constitute the cladding slab contains a metal element that oxidizes more readily than Al. By hot rolling such a cladding slab, at least one layer among the layers that constitute the clad sheet can be composed of an aluminum alloy that contains a metal element that oxidizes more readily than Al.

The above-described metal element (herein below, called the "oxide-film breakdown element" where appropriate) that oxidizes more readily than Al may, for example, be included in the core material or may be included in the filler material. In addition, the oxide-film breakdown element may be included in both the core material and the filler material. In the situation in which the intermediate material is interposed between the core material and the filler material, the oxide-film breakdown element can also be added to the intermediate material. Thereby, when brazing is to be performed, brazing can be performed by breaking down fragments of oxide film present on the surface of the brazing sheet, fragments of oxide film present on the surface of the opposing material, etc.

For example, Mg (magnesium), Li (lithium), Ca (calcium), etc. are examples of such an oxide-film breakdown element. From the viewpoint of further improving brazeability in flux-free brazing, the clad sheet preferably has at least one among Mg and Li as an oxide-film breakdown element, and more preferably contains Mg.

The chemical composition of each layer that constitutes the aluminum slab and the clad sheet will now be explained in further detail.

(Core-Material Slab and Core Material)

The core-material slab is the aluminum slab that will form the core material of the clad sheet. An aluminum material having a solidus temperature higher than the solidus temperature of the filler material can be used as the core material. For example, a JIS A1000-series aluminum, A3000-series alloy, A5000-series alloy, A6000-series alloy, or the like can be used as the core material.

In the situation in which the core material contains a metal element that acts to break down oxide films, the core material may have a chemical composition that, for example, contains Mg (magnesium): 0.10-4.0 mass %, the remainder being Al and unavoidable impurities. In this situation, the filler material may contain, but does not have to contain, an oxide-film breakdown element.

Mg in the core material diffuses due to heating during brazing and moves into the filler material. Furthermore, by virtue of the Mg that has moved into the filler material breaking down the oxide films present on the surface of the filler material and on the surface of the opposing material, brazing can be performed without using flux.

By setting the amount of Mg in the core material to 0.10 mass % or more and preferably to 0.20 mass % or more, the oxide films present on the surface of the filler material and on the surface of the opposing material can be sufficiently broken down, and thereby brazing can be performed. In the situation in which the amount of Mg in the core material is less than 0.10 mass %, there is a risk that the breakdown of the oxide films by Mg will become insufficient, and thereby brazing will no longer be able to be performed.

On the other hand, if the amount of Mg in the core material becomes excessive, then Mg oxides will readily form on the surface of the brazing sheet. If Mg oxides become excessive, then there is a risk that it will lead to degradation in brazeability. By setting the amount of Mg in the core material to 4.0 mass % or less and preferably to 1.5 mass % or less, degradation in brazeability due to oxidation of Mg can be avoided.

The core material may further contain one or two or more from among Mn (manganese), Si (silicon), Fe (iron), Cu (copper), Zn (zinc), Ti (titanium), Cr (chrome), and Zr (zirconium).

In the situation in which the core material contains Mn, the amount of Mn can be set to 0.05 mass % or more and 1.60 mass % or less. Setting the amount of Mn in the core material to 0.05 mass % or more further increases the strength of the core material and, by adjusting the electric potential of the core material, can further improve corrosion resistance. However, if the amount of Mn in the core material becomes excessive, then cracks will tend to occur in the core material during the process of manufacturing the brazing sheet. By setting the amount of Mn in the core material to 1.60 mass % or less, the strength and corrosion resistance of the core material can be further increased while avoiding degradation in the manufacturability of the brazing sheet.

In the situation in which the core material contains Si, the amount of Si can be set to greater than 0 mass % and 1.0 mass % or less. Si acts to increase the strength of the core material. However, if the amount of Si in the core material becomes excessive, then there is a risk that the melting point of the core material will decrease, which will lead to degradation in brazeability. By setting the amount of Si in the core material to 1.0 mass % or less, the strength of the core material can be further increased while avoiding degradation in brazeability.

In the situation in which the core material contains Fe, the amount of Fe can be set to greater than 0 mass % and 1.0 mass % or less. Fe acts to increase the strength of the core material. However, if the amount of Fe in the core material becomes excessive, then there is a risk that it will lead to degradation in the corrosion resistance of the core material. In addition, in this situation, there is also a risk that very large precipitates will tend to be formed in the core material, which will lead to a decrease in the ductility of the brazing sheet. By setting the amount of Fe in the core material to 1.0 mass % or less, these problems can be avoided while at the same time the strength of the core material can be further increased.

In the situation in which the core material contains Cu, the amount of Cu can be set to greater than 0 mass % and 2.0 mass % or less. Cu acts to increase the strength of the core material. In addition, Cu acts to improve corrosion resistance by adjusting the electric potential of the core material. However, if the amount of Cu in the core material becomes excessive, then intergranular corrosion will tend to occur. In addition, in this situation, there is a risk that the melting point of the core material will decrease, which will lead to degradation in brazeability. By setting the amount of Cu in the core material to 2.0 mass % or less, these problems can be avoided while at the same time the strength and corrosion resistance of the core material can be further increased.

In the situation in which the core material contains Zn, the amount of Zn can be set to greater than 0 mass % and 6.50 mass % or less. Zn acts to lower the natural electrode potential of the core material. By lowering the natural potential of the core material, the core material can function as a sacrificial anode. However, if the Zn content becomes excessive, then there is a risk that the natural electrode potential of the core material will decrease excessively, which will diminish the sacrificial corrosion-inhibiting effect at an early stage. By setting the Zn content to 6.50 mass % or less, the sacrificial corrosion-inhibiting effect due to the core material can be maintained over a longer term.

In the situation in which the core material contains Ti, the amount of Ti can be set to greater than 0 mass % and 0.20 mass % or less. Ti acts to cause corrosion of the core material to advance in a laminar manner and to curtail the advancement of corrosion in the depth direction. However, if the Ti content becomes excessive, then there is a risk that very large precipitates will tend to form in the core material, which will lead to degradation in rollability in the process of manufacturing the brazing sheet. In addition, in this situation, there is also a risk that it will instead lead to degradation in the corrosion resistance of the core material. By setting the amount of Ti in the core material to 0.20 mass % or less, such problems can be avoided while at the same time the advancement of corrosion in the depth direction of the core material can be curtailed more effectively.

In the situation in which the core material contains Cr, the amount of Cr can be set to greater than 0 mass % and 0.50 mass % or less. Cr makes the grain size of the core material large and thereby acts to curtail the occurrence of erosion. However, if the amount of Cr in the core material becomes excessive, then cracks in the core material tend to occur in the process of manufacturing the brazing sheet. By setting the amount of Cr in the core material to 0.50 mass % or less, the occurrence of erosion can be curtailed more effectively while avoiding degradation in the manufacturability of the brazing sheet.

In the situation in which the core material contains Zr, the amount of Zr can be set to greater than 0 mass % and 0.50 mass % or less. Zr makes the grain size of the core material large and thereby acts to curtail the occurrence of erosion. However, if the amount of Zr in the core material becomes excessive, then cracks in the core material will tend to occur in the process of manufacturing the brazing sheet. By setting the amount of Zr in the core material to 0.50 mass % or less, the occurrence of erosion can be curtailed more effectively while avoiding degradation in the manufacturability of the brazing sheet.

(Filler-Material Slab and Filler Material)

The filler-material slab is an aluminum slab that will form the filler material of the clad sheet. The filler material is composed of an Al—Si series alloy. The Al—Si series alloy that constitutes the filler material has a chemical composition that, for example, contains Si: 6.0-13.0 mass %, the remainder being Al and unavoidable impurities. By setting the amount of Si in the filler material to the above-mentioned specific range, the melting point of the filler material is suitably lowered, and thereby brazing can be performed such that molten filler is caused to flow when the filler material is heated during brazing. In the situation in which the amount of Si in the filler material is less than 6.0 mass %, there is a risk that a problem will occur, such as the amount of filler being insufficient, the fluidity of the filler decreasing, or the like.

If the amount of Si in the core material is greater than 13.0 mass %, then there is a risk that the amount of melted core material will become excessive during heating when brazing is being performed. In addition, in this situation, coarse primary phase Si tends to form in the filler material. Then, after melting of the filler material, there is a risk that well-shaped melt holes will tend to form, in which the coarse primary phase Si are the starting points.

In the situation in which the filler material contains a metal element that acts to break down oxide films, in addition to Si, the filler material may further contain as an essential component at least one from among Mg (magnesium): greater than 0.10 mass % and 2.0 mass % or less and Li (lithium): 0.0010-0.30 mass %.

Mg and Li in the filler material can break down the oxide films present on the surface of the filler material and on the surface of the opposing material. Thereby, brazing can be performed without the use of flux.

The amount of Mg in the brazing material preferably is 0.10-2.0 mass %. By setting the amount of Mg in the filler material to be greater than 0.10 mass %, the oxide films present on the surface of the filler material and on the surface of the opposing material can be sufficiently broken down, and thereby brazing can be performed. From the viewpoint of further improving brazeability using the brazing sheet, the amount of Mg in the filler material more preferably is set to 0.20 mass % or more.

It is noted that, in the situation in which the amount of Mg in the filler material is greater than 0.10 mass %, the oxide films can be sufficiently broken down during brazing by the Mg in the filler material. For this reason, in this situation, the layers adjacent to the filler material, that is, the layers of, for example, the core material, the intermediate material, and the like, may contain, but do not have to contain, an element, such as Mg, that is capable of breaking down oxide films. In addition, the amount of such element contained in these layers is not particularly limited.

If the amount of Mg in the filler material becomes excessive, then Mg oxides will tend to be formed on the surface of the brazing sheet. If Mg oxides become excessive, then there is a risk that it will lead to degradation in brazeability. By setting the amount of Mg in the filler material to 2.0 mass % or less and more preferably to 1.5 mass % or less, degradation in brazeability due to oxidation of Mg can be avoided.

The amount of Li in the filler material is preferably 0.0010-0.30 mass %. By setting the amount of Li in the filler material to 0.0010 mass % or more, the oxide films present on the surface of the filler material and on the surface of the opposing material can be sufficiently broken down, and thereby brazing can be performed. From the viewpoint of further improving brazeability using the brazing sheet, the Li content in the filler material is preferably set to 0.0040 mass % or more.

It is noted that, in the situation in which the amount of Li in the filler material is 0.0010 mass % or more, the oxide films can be sufficiently broken down during brazing by the Li in the filler material. For this reason, in this situation, the layers adjacent to the filler material may contain, but do not have to contain, an element, such as Mg, that is capable of breaking down the oxide films. In addition, the amount of such element contained in these layers is not particularly limited.

If the amount of Li in the filler material becomes excessive, then Li oxides tend to form on the surface of the brazing sheet. If Li oxides become excessive, then there is a risk that it will lead to degradation in brazeability. By setting the amount of Li in the filler material to 0.30 mass % or less and preferably to 0.10 mass % or less, degradation in brazeability due to oxidation of Li can be avoided.

In the situation in which the amount of Mg in the filler material is 0.10 mass % or less (including 0 mass %) and the amount of Li is 0.0010 mass % or less (including 0 mass %), the layers adjacent to the filler material preferably are composed of an aluminum alloy that contains 0.20 mass % or more of Mg. In this situation, owing to the Mg in the filler material and the Mg that has diffused into the filler material from the layers adjacent to the filler material, the oxide films can be sufficiently broken down during brazing.

Bi (bismuth) may be added to the filler material. In the situation in which the filler material contains Bi, the Bi content is preferably 0.0040-1.0 mass %. By setting the amount of Bi in the filler material to 0.0040 mass % or more and more preferably to 0.010 mass % or more, the surface tension of the molten filler can be lowered. Thereby, the fluidity of the molten filler can be further increased and, in turn, brazeability can be further improved.

If the amount of Bi in the filler material becomes excessive, then it becomes difficult to obtain the effect of improving brazeability commensurate with the amount of Bi. In addition, in this situation, there is a risk that the filler material after brazing will tend to discolor, resulting in a defective external appearance. By setting the amount of Bi in the filler material to 1.0 mass % or less and more preferably to 0.20 mass % or less, these problems can be avoided while at the same time brazeability can be further improved.

One or two or more from among Cu, Zn, Sn (tin), In (indium), Sr (strontium), Na (sodium), and Sb (antimony) may be further added to the filler material.

In the situation in which the filler material contains Cu, the amount of Cu can be set to greater than 0 mass % and 2.0 mass % or less. The Cu in the filler material acts to raise the natural electrode potential of the filler material and to lower the melting point. By setting the amount of Cu in the filler material to the above-mentioned specific range, the natural electrode potential of the filler material can be suitably raised, and thereby the corrosion resistance of the filler material can be improved. In addition, by setting the amount of Cu in the filler material to the above-mentioned specific range, the fluidity of the molten filler can be increased, and thereby brazeability can be further improved.

In the situation in which the filler material contains Zn, the amount of Zn can be set to greater than 0 mass % and 6.50 mass % or less. In the situation in which the filler material contains Sn, the amount of Sn can be set to greater than 0 mass % and 0.10 mass % or less. In the situation in which the filler material contains In, the amount of In can be set to greater than 0 mass % and 0.10 mass % or less.

The Zn, Sn, and In in the filler material each act to lower the natural electrode potential of the filler material. By setting the amount of Zn, the amount of Sn, and the amount of In in the filler material to the above-mentioned specific ranges, the filler material is caused to function as a sacrificial anode, and thereby the corrosion resistance of the aluminum structure after brazing can be further improved.

In the situation in which the amount of Zn in the filler material is greater than 6.50 mass %, in the situation in which the amount of Sn is greater than 0.10 mass %, or in the situation in which the amount of In is greater than 0.10 mass %, there is a risk that the natural electrode potential of the filler material will decrease excessively. As a result, there is a risk that the sacrificial corrosion-inhibiting effect due to the filler material will be diminished at an early stage.

In the situation in which the filler material contains Sr, the amount of Sr can be set to greater than 0 mass % and 0.030 mass % or less. In the situation in which the filler material contains Na, the amount of Na can be set to greater than 0 mass % and 0.030 mass % or less. In the situation in which the filler material contains Sb, the amount of Sb can be set to greater than 0 mass % and 0.030 mass % or less.

Sr, Na, and Sb in the filler material each act to increase the fineness of the Si particles in the filler material, thereby improving the fluidity of the molten filler. By setting the amount of Sr, the amount of Na, and the amount of Sb in the filler material to the above-mentioned specific ranges, the fluidity of the molten filler increases, and thereby brazeability can be further improved.

(Intermediate-Material Slab and Intermediate Material)

By disposing an intermediate-material slab between the core-material slab and the filler-material slab when the cladding slab is to be prepared, an intermediate material, which is composed of the intermediate-material slab, can be interposed between the core material and the filler material in the clad sheet. The intermediate material has a chemical composition that differs from those of the core material and the filler material. The intermediate material may have a chemical composition that, for example, contains Mg: 0.40-6.0 mass %, the remainder being Al and unavoidable impurities. In this situation, the filler material and the core material may contain, but do not have to contain, a metal element that acts to break down oxide films.

The same as the Mg in the core material, Mg in the intermediate material diffuses due to the heating during brazing and thereby moves into the filler material. Furthermore, by virtue of the Mg that has moved into the filler material breaking down the oxide films present on the surface of the filler material and on the surface of the opposing material, brazing can be performed without using flux.

By setting the amount of Mg in the intermediate material to 0.40 mass % or more, the oxide films present on the surface of the filler material and on the surface of the opposing material are sufficiently broken down, and thereby brazing can be performed. In the situation in which the amount of Mg in the intermediate material is less than 0.40 mass %, there is a risk that the breakdown of the oxide films by Mg will become insufficient, and thereby brazing will no longer be able to be performed.

On the other hand, if the amount of Mg in the intermediate material becomes excessive, then Mg oxides will tend to be formed on the surface of the brazing sheet. If Mg oxides become excessive, then there is a risk that it will lead to degradation in brazeability. By setting the amount of Mg in the intermediate material to 6.0 mass % or less, degradation in brazeability due to oxidation of the Mg can be avoided.

The intermediate material may further contain one or two or more from among Mn, Si, Fe, Cu, Zn, Ti, Cr, and Zr.

In the situation in which the intermediate material contains Mn, the amount of Mn can be set to greater than 0 mass % and 2.0 mass % or less. The same as the Mn in the core material, Mn in the intermediate material further increases the strength of the intermediate material and, by adjusting the electric potential of the intermediate material, further improves corrosion resistance. However, if the amount of Mn in the intermediate material becomes excessive, then cracks in the intermediate material tend to occur in the process of manufacturing the brazing sheet. By setting the amount of Mn in the intermediate material to the above-mentioned specific range, the strength and corrosion resistance can be further increased while avoiding degradation in the manufacturability of the brazing sheet.

In the situation in which the intermediate material contains Si, the amount of Si can be set to greater than 0 mass % and 1.0 mass % or less. The same as the Si in the core material, the Si in the intermediate material acts to increase the strength of the intermediate material. However, if the amount of Si in the intermediate material becomes excessive, then there is a risk that the melting point of the intermediate material will decrease, which will lead to degradation in brazeability. By setting the amount of Si in the intermediate material to 1.0 mass % or less, the strength of the intermediate material can be further increased while avoiding degradation in brazeability.

In the situation in which the intermediate material contains Fe, the amount of Fe can be set to greater than 0 mass % and 1.0 mass % or less. The same as the Fe in the core material, Fe in the intermediate material acts to increase the strength of the intermediate material. However, if the amount of Fe in the intermediate material becomes excessive, then there is a risk that it will lead to degradation in the corrosion resistance of the intermediate material. In addition, in this situation, there is also a risk that very large precipitates will tend to form in the intermediate material, which will lead to a decrease in the ductility of the brazing sheet. By setting the amount of Fe in the intermediate material to 1.0 mass % or less, these problems can be avoided while at the same time the strength of the intermediate material can be further increased.

In the situation in which the intermediate material contains Cu, the amount of Cu can be set to greater than 0 mass % and 2.0 mass % or less. The same as the Cu in the core material, Cu in the intermediate material acts to increase the strength of the intermediate material. In addition, Cu adjusts the electric potential of the intermediate material and thereby acts to improve corrosion resistance. However, if the amount of Cu in the intermediate material becomes excessive, then intergranular corrosion tends to occur. In addition, in this situation, there is a risk that the melting point of the intermediate material will decrease, which will lead to degradation in brazeability. By setting the amount of Cu in the intermediate material to 2.0 mass % or less, these problems can be avoided while at the same time the strength and corrosion resistance of the intermediate material can be further increased.

In the situation in which the intermediate material contains Zn, the amount of Zn can be set to greater than 0 mass % and 6.50 mass % or less. The same as the Zn in the core material, Zn in the intermediate material acts to lower the natural electrode potential of the intermediate material. By lowering the natural potential of the intermediate material, the intermediate material can be caused to function as a sacrificial anode. However, if the Zn content becomes excessive, then there is a risk that the natural electrode potential of the intermediate material will decrease excessively, and thereby the sacrificial corrosion-inhibiting effect will be diminished at an early stage. By setting the Zn content to 6.50 mass % or less, the sacrificial corrosion-inhibiting effect due to the intermediate material can be maintained over a longer term.

In the situation in which the intermediate material contains Ti, the amount of Ti can be set to greater than 0 mass % and 0.20 mass % or less. The same as the Ti in the core material, Ti in the intermediate material acts to cause corrosion of the intermediate material to advance in a laminar manner and to curtail the advancement of corrosion in the depth direction. However, if the Ti content becomes excessive, then there is a risk that very large precipitates will be formed in the intermediate material, which will lead to a degradation in rollability in the process of manufacturing the brazing sheet. In addition, in this situation, there is a risk that it will instead lead to a degradation in the corrosion resistance of the intermediate material. By setting the amount of Ti in the intermediate material to 0.20 mass % or less, such problems can be avoided while at the same time the advancement of corrosion in the depth direction of the intermediate material can be curtailed more effectively.

In the situation in which the intermediate material contains Cr, the amount of Cr can be set to greater than 0 mass % and 0.50 mass % or less. Cr makes the grain size large and thereby acts to curtail the occurrence of erosion. However, if the amount of Cr in the intermediate material becomes excessive, then cracks in the intermediate material tend to occur in the process of manufacturing the brazing sheet. By setting the amount of Cr in the intermediate material to 0.50 mass % or less, the occurrence of erosion can be curtailed more effectively while avoiding degradation in the manufacturability of the brazing sheet.

In the situation in which the intermediate material contains Zr, the amount of Zr can be set to greater than 0 mass % and 0.50 mass % or less. Zr makes the grain size of the intermediate material large and thereby acts to curtail the occurrence of erosion. However, if the amount of Zr in the intermediate material becomes excessive, then cracks in the intermediate material tend to occur in the process of manufacturing the brazing sheet. By setting the amount of Zr in the intermediate material to 0.50 mass % or less, the occurrence of erosion can be curtailed more effectively while avoiding degradation in the manufacturability of the brazing sheet.

(Sacrificial-Anode-Material Slab and Sacrificial-Anode Material)

By disposing the filler-material slab on one surface of the core-material slab and disposing a sacrificial-anode-material slab on the other surface when the above-mentioned cladding slab is to be prepared, the filler material can be disposed on one surface of the core material in the clad sheet and the sacrificial-anode material, which is composed of the sacrificial-anode-material slab, can be disposed on the other surface. The sacrificial-anode material may be composed of, for example, an aluminum alloy that contains one or two or more from among Zn, Sn, and In.

In the situation in which the sacrificial-anode material contains Zn, the amount of Zn can be set to greater than 0 mass % and 6.50 mass % or less. In the situation in which the sacrificial-anode material contains Sn, the amount of Sn can be set to greater than 0 mass % and 0.10 mass % or less. In the situation in which the sacrificial-anode material contains In, the amount of In can be set to greater than 0 mass % and 0.10 mass % or less.

The same as the Zn, Sn, and In in the filler material, the Zn, Sn, and In in the sacrificial-anode material acts to lower the natural electrode potential of the sacrificial-anode material. By setting the amount of Zn, the amount of Sn, and the amount of In in the sacrificial-anode material to the above-mentioned specific ranges, the corrosion resistance of the aluminum structure after brazing can be further improved.

In the situation in which the amount of Zn in the sacrificial-anode material is greater than 6.50 mass %, in the situation in which the amount of Sn is greater than 0.10 mass %, or in the situation in which the amount of In is greater than 0.10 mass %, there is a risk that the natural electrode potential of the sacrificial-anode material will decrease excessively. As a result, there is a risk that the sacrificial corrosion-inhibiting effect due to the sacrificial-anode material will be diminished at an early stage.

In a method of manufacturing the brazing sheet, first, a core-material slab and a filler-material slab are prepared and, as needed, other aluminum slabs, such as an intermediate-material slab, a sacrificial-anode-material slab, or the like, are prepared. These aluminum slabs are overlayed in a desired order to prepare a cladding slab, after which it is hot rolled. Thereby, a clad sheet can be obtained by joining adjacent aluminum slabs together.

In the interval from after hot rolling has been performed until etching is performed using a liquid etchant that contains an acid, a homogenization treatment, a heat treatment such as annealing, hot rolling, and cold rolling are performed in combination as appropriate on the clad sheet, and the thickness of the clad sheet may approach the desired thickness of the brazing sheet. The thickness of the clad sheet at this time can be set as appropriate in accordance with the desired thickness of the brazing sheet and the rolling reduction of the cold rolling performed after the etching. An oxide film, which forms owing to the above-described rolling and heat treatment, is present on the surface of the clad sheet obtained in this manner.

In a method of manufacturing the brazing sheet, in the interval from after hot rolling has been performed until etching of the clad sheet has been performed, it is preferable to perform cold rolling on the clad sheet to a rolling reduction of 20% or more. A sturdy oxide film, which forms during the hot rolling, is present on the surface of the clad sheet after the hot rolling. By cold rolling the clad sheet after the hot rolling, the oxide film present on the surface of the clad sheet becomes fragmented, and thereby fragments of the oxide film can be formed.

At this time, by setting the rolling reduction of the cold rolling to 20% or more, the oxide film can be more finely fragmented, and thereby borders between the fragments of the oxide film can be formed more densely. When the etching is performed on such a clad sheet, the etching advances from the borders between the fragments of the oxide film, and thereby the bond between the oxide film and the base material can be made yet weaker. As a result, the oxide film will be fragmented yet more finely in the cold rolling after the etching, and thereby brazeability can be further improved.

Next, the surface of the clad sheet is etched using a liquid etchant that contains an acid. More specifically, the etching includes a process in which the liquid etchant is brought into contact with the surface of the clad sheet, a process in which the clad sheet is rinsed after being brought into contact with the liquid etchant, and a process in which the clad sheet is dried after being rinsed.

In the process in which the liquid etchant is brought into contact with the surface of the clad sheet, the thickness of the oxide film that is present on the surface of the clad sheet may be made thinner, or the oxide film may be removed completely. In the case of the former, because the thickness of the oxide film after etching is thinner than before etching, the oxide film after etching becomes more fragile than it was before etching.

In addition, in the case of the latter, in the interval from after the oxide film has been removed until cold rolling is performed, the surface of the clad sheet is brought into contact with outside air. Consequently, even in the situation in which the oxide film has been completely removed, an oxide film forms on the surface of the filler material in the interval until cold rolling is performed. However, the oxide film formed in this manner is more fragile than the oxide film formed in the process of manufacturing the clad sheet.

Accordingly, by bringing the liquid etchant, which contains an acid, into contact with the surface of the clad sheet, the oxide film that is present on the surface of the filler material can be made fragile. As a result, in the subsequently performed cold rolling, the oxide film can be fragmented easily.

The etching amount is preferably 0.05-2 $g/m^2$ in the etching. By setting the etching amount to 0.05 $g/m^2$ or more and more preferably to 0.1 $g/m^2$ or more, the oxide film present on the surface of the clad sheet is made sufficiently fragile, and thereby the oxide film can be fragmented more easily during the subsequently performed cold rolling.

In addition, by setting the etching amount to 2 $g/m^2$ or less and more preferably to 0.5 $g/m^2$ or less, the oxide film is made sufficiently fragile while at the same time, by shortening the time needed for the etching, the productivity of the brazing sheet can be further improved.

In the above-mentioned etching, for example, an aqueous solution of an acid can be used as the liquid etchant. One or two or more from among, for example, sulfuric acid, hydrochloric acid, nitric acid, phosphoric acid, and hydrofluoric acid can be used as the acid contained in the liquid etchant. From the viewpoint of further enhancing the effect of making the oxide film fragile, the liquid etchant preferably contains hydrofluoric acid as the acid and more preferably contains hydrofluoric acid and an inorganic acid other than hydrofluoric acid. For example, one or two or more selected from among acids such as sulfuric acid, hydrochloric acid, nitric acid, and phosphoric acid can be used as the inorganic acid(s). It is particularly preferable to use nitric acid or sulfuric acid as the inorganic acid.

By using a liquid etchant that contains hydrofluoric acid and an inorganic acid, the concentration of hydrofluoric acid in the aqueous solution can be further decreased while maintaining the etch rate. As a result, etching can be performed more safely, and the environmental impact due to the etching can be further reduced.

The liquid etchant preferably further contains at least one from among a surfactant and a reaction accelerator, and more preferably contains both. By performing the etching using a liquid etchant that contains a surfactant, a reaction accelerator, or the like, the time needed for etching can be further shortened, the occurrence of nonuniformity in the reaction can be curtailed, and the entire brazing sheet can be etched evenly.

After the etching has been performed in this manner, the clad sheet is cold rolled until it reaches the desired thickness, and thereby the brazing sheet is obtained. This cold rolling may be performed in one pass or in multiple passes. In addition, a heat treatment, such as annealing, can also be performed in the cold rolling, as needed, prior to the first pass of rolling, between passes, as well as after the last pass has been performed, etc.

In the situation in which annealing is performed during cold rolling, water of hydration can be removed from hydrated oxides of aluminum formed when rinsing was performed at the time of etching. Consequently, in this situation, moisture released from the brazing sheet during brazing further decreases, and thereby an increase in the dew point during brazing can be more effectively curtailed. As a result, brazeability can be further improved.

The rolling reduction of the cold rolling after etching has been performed is preferably 5-80%. That is, the difference between the thickness of the clad sheet before cold rolling is performed after the etching has been performed and the desired thickness of the brazing sheet is preferably 5-80% of the thickness of the clad sheet. By setting the rolling reduction of the cold rolling after etching to 5% or more, more preferably to 15% or more, and even more preferably to 25% or more, the oxide film is more finely fragmented, and thereby a much greater number of oxide-film borders, which will form the starting points of brazing, can be formed. As a result, brazeability due to the brazing sheet can be further improved.

In addition, by setting the rolling reduction of the cold rolling after the etching to 80% or less and more preferably to 75% or less, wear of the clad sheet during cold rolling can be curtailed. As a result, the amount of abrasion particles produced during cold rolling can be further reduced, and thereby degradation in brazeability due to abrasion particles can be avoided.

An oxide film, which has been fragmented into multiple fragments, is present on the surface of the filler material of the brazing sheet obtained by the above-mentioned manufacturing method. Cold-rolling oil may adhere to the surface of the brazing sheet but does not have to adhere. For example, in the situation in which annealing is not performed after the last pass of the cold rolling, in the situation in which the heating temperature of the annealing is comparatively low, or the like, cold-rolling oil that has adhered during the cold working can be caused to remain on the surface of the brazing sheet.

From the viewpoint of more effectively curtailing oxidation of the surface of the brazing sheet, it is preferable that cold-rolling oil adheres to the surface of the brazing sheet. In this situation, the cold-rolling oil protects the fragments of the oxide film present on the surface of the filler material, and thereby growth of the oxide film can be curtailed more effectively. Furthermore, the cold-rolling oil penetrates into gaps between the fragments of the oxide film, and thereby newly created surfaces of the filler material present between the gaps can be protected from the outside air. As a result of these, the performance of the brazing sheet can be maintained over a longer term.

The thermal-decomposition temperature of the cold-rolling oil is preferably 200-380° C. By using cold-rolling oil whose thermal-decomposition temperature is 200° C. or higher, the amount of cold-rolling oil volatilized in the interval from after the brazing sheet has been prepared until brazing is performed can be reduced. As a result, the performance of the brazing sheet can be maintained over a longer term.

In addition, by using cold-rolling oil whose thermal-decomposition temperature is 380° C. or lower, the cold-rolling oil can be caused to volatilize reliably before the filler material begins to melt during the heating when brazing is being performed. As a result, cold-rolling oil remaining on the filler-material surface can be avoided and, in turn, degradation in brazeability due to cold-rolling oil remaining on the filler-material surface can be reliably avoided.

The amount of cold-rolling oil that adheres to the surface of the brazing sheet is preferably 250 $mg/cm^2$ or more. In this situation, the amount of cold-rolling oil that covers the fragments of the oxide film and the newly created surfaces of the filler material is made sufficiently large, and thereby growth of the oxide film and oxidation of the newly created surfaces of the filler material can be curtailed over a longer term. As a result, the performance of the brazing sheet can be maintained over a longer term.

The brazing sheet obtained by the above-mentioned manufacturing method can be used in flux-free brazing, that is, in brazing that is performed in an inert-gas atmosphere without the application of flux. For example, nitrogen, argon, helium, or the like can be used as the inert gas.

In flux-free brazing, if the oxygen concentration and the dew point in the inert-gas atmosphere are excessively high, then there is a risk that it will lead to degradation in brazeability. However, with regard to the above-mentioned brazing sheet, because the oxide film present on the surface of the filler material is pre-fragmented as described above, degradation in brazeability can be avoided even if the oxygen concentration and the dew point are higher than in flux-free brazing in the past. For example, in the situation in which flux-free brazing is performed using the above-mentioned brazing sheet, brazing can be performed in an inert-gas atmosphere in which the oxygen concentration is 100 vol. ppm or less and the dew point is −30° C. or lower.

In addition, if the time needed from when heating when brazing is being performed is started until the filler material melts is excessively long, then oxidation of the surface of the filler material will progress, and therefore there is a risk that it will lead to degradation in brazeability. From the viewpoint of avoiding such problems, brazing is preferably performed under a heating condition in which the time needed from when the temperature of the brazing sheet reaches 300° C. until the temperature of the brazing sheet reaches the solidus temperature of the filler material is 40 min or less.

WORKING EXAMPLES

Working examples of the method of manufacturing the brazing sheet are explained below. It is noted that the aspects of the method of manufacturing the brazing sheet according to the present invention are not limited to the aspects of the working examples described below, and the constitutions can be modified as appropriate within a range that does not depart from the gist thereof.

The chemical compositions of the filler materials used in the present example are as listed in Table 1 (alloy symbols A1-A3). In addition, the chemical compositions of the core materials used in the present example are as listed in Table 2 (alloy symbols B1-B3). The symbol "-" in Table 1 and Table 2 is a symbol that indicates that the particular element is not actively added and the content does not exceed that of an unavoidable impurity. In addition, the symbol "Bal" in the same tables indicates the remainder.

Test Example 1

In the present example, brazing sheets (Table 3, Test Materials C1-C17), in which a filler material was disposed on one side of a core material for each brazing sheet, were prepared using the manufacturing method described below. First, filler-material slabs having the chemical compositions (alloy symbols A1-A3) listed in Table 1 and core-material slabs having the chemical compositions (alloy symbols B1-B3) listed in Table 2 were prepared. These filler-material slabs and core-material slabs were overlayed in the combinations listed in Table 3, and thereby the cladding slabs, in which a filler-material slab was disposed on one side of each core-material slab, were prepared.

These cladding slabs were hot rolled to prepare clad sheets whose sheet thickness was 3.0 mm. It is noted that the cladding percentage of the filler material of the clad sheets, that is, the ratio of the filler-material thickness to the clad-sheet thickness, was 10%. Then, cold rolling was performed until the thickness of the clad sheets became 0.65 mm. It is noted that the rolling reduction of this cold rolling was approximately 78.3%.

With regard to the preparation of Test Materials C1-C14, after each clad sheet obtained in this manner was degreased and cleaned, the clad sheet was etched. The etching of the clad sheets was performed specifically using the method below. First, the liquid etchant containing an acid was brought into contact with the surface of the clad sheet. The liquid etchant in the present example was an aqueous solution that contained an acid having the concentration listed in Table 3. Then, after the clad sheets were rinsed to remove the liquid etchant, the clad sheets were dried.

Table 3 lists the etching amounts for the etching of each clad sheet. Each etching amount listed in Table 3 is the difference between the mass per unit of area of the clad sheet before being brought into contact with the liquid etchant and the mass per unit of area of the clad sheet after having been dried.

Thereafter, by hot rolling each clad sheet until its thickness became 0.40 mm, the brazing sheets (Test Materials C1-C14) listed in Table 3 could be obtained. It is noted that the rolling reduction of this cold rolling was approximately 38.5%.

With regard to the preparation of Test Materials C15-C16, the order in which the clad-sheet etching and the subsequent cold rolling were performed in the method of manufacturing Test Materials C1-C14 was switched. That is, with regard to Test Materials C15-C16, by further performing hot rolling of the clad sheet having a thickness of 0.65 mm, the thickness of the clad sheet was made 0.40 mm. Thereafter, Test Materials C15-C16 could be obtained by degreasing, cleaning, and etching each clad sheet using the same methods as those for Test Materials C1-C14.

With regard to the preparation of Test Material C17, the etching of the clad sheet, as in Test Materials C1-C14, was omitted. That is, with regard to Test Material C17, the clad sheet having a thickness of 0.65 mm was degreased and cleaned. Thereafter, Test Material C17 could be obtained by performing cold rolling, without the performance of etching, to make the thickness 0.40 mm.

Evaluation of Brazeability Using a Gap-Filling Test

By performing a gap-filling test, the brazeability of each test material could be evaluated. As shown in the sole FIGURE, a test specimen 1 used in the gap-filling test comprised a horizontal sheet 2, which was sampled from the test material, and a perpendicular sheet 3, which was disposed on a filler material 21 of the horizontal sheet 2. The perpendicular sheet 3 was disposed with an orientation such that it was orthogonal to the horizontal sheet 2. In addition, one end 31 of the perpendicular sheet 3 in the longitudinal direction is in contact with the filler material 21 of the horizontal sheet 2. It is noted that the width of the horizontal sheet 2 in the present example was 25 mm and the length was 60 mm. In addition, the perpendicular sheet 3 was an aluminum sheet that was composed of a JIS A3003 alloy, having a width of 25 mm, a length of approximately 55 mm, and a thickness of 1 mm.

A spacer 4 was interposed between other end 32 of the perpendicular sheet 3 in the longitudinal direction and the horizontal sheet 2. Thereby, a gap S, which gradually widened from the one end 31 of the perpendicular sheet 3 toward the spacer 4 side, was formed between the horizontal sheet 2 and the perpendicular sheet 3. It is noted that the spacer 4 in the present example was, specifically, a round wire that was made of stainless steel having a diameter of 1.6 mm and was disposed at a location at which it was separated by 55 mm in the horizontal direction from the location (one end 31) at which the perpendicular sheet 3 is in contact with the horizontal sheet 2.

The brazing of the test specimen 1 was performed using a nitrogen-gas furnace. The in-furnace atmosphere was made into a nitrogen-gas atmosphere having an oxygen concentration of 10 vol. ppm or less. The test specimen 1 was disposed in the furnace in the state in which the in-furnace temperature was 100° C. or less, and, after the test specimen 1 was left in the furnace for 10 min, the heating for brazing was started. The heating for brazing was performed by raising the temperature of the test specimen until the temperature became 600° C. After the heating for brazing was completed, the test specimen was cooled in the furnace until the temperature fell to a certain extent, after which the test specimen was removed to outside the furnace.

In the gap-filling test, the state of a fillet F (see the sole FIGURE) formed after brazing was observed based on its external appearance; brazeability was ranked according to the below-described ratings A-D based on the length L (see the sole FIGURE) over which the fillet filled in the gap.

A: The length over which the fillet filled in the gap was 30 mm or more.

B: The length over which the fillet filled in the gap was 25 mm or more and less than 30 mm.

C: The length over which the fillet filled in the gap was 15 mm or more and less than 25 mm.

D: The length over which the fillet filled in the gap was less than 15 mm.

Ratings A and B indicate brazeability of a practical level. The results of brazeability in the gap-filling tests are listed in Table 3.

TABLE 1

| Alloy Symbol | Chemical Composition (mass %) | | | | | | | | | |
|---|---|---|---|---|---|---|---|---|---|---|
| | Si | Fe | Cu | Mn | Mg | Cr | Ti | Zn | Bi | Al |
| A1 | 10.2 | 0.20 | <0.02 | <0.05 | 0.36 | <0.02 | <0.02 | <0.05 | 0.224 | bal. |
| A2 | 9.9 | 0.19 | <0.02 | <0.05 | 0.68 | <0.02 | <0.02 | <0.05 | 0.321 | bal. |
| A3 | 10.2 | 0.19 | <0.02 | <0.05 | 0.01 | <0.02 | <0.02 | <0.05 | 0.095 | bal. |

TABLE 2

| Alloy Symbol | Chemical Composition (mass %) | | | | | | | | | |
|---|---|---|---|---|---|---|---|---|---|---|
| | Si | Fe | Cu | Mn | Mg | Cr | Ti | Zn | Bi | Al |
| B1 | 0.22 | 0.31 | 0.159 | 1.20 | <0.05 | <0.02 | <0.02 | <0.05 | — | bal. |
| B2 | 0.22 | 0.33 | 0.162 | 1.24 | 0.65 | <0.02 | 0.118 | <0.05 | — | bal. |
| B3 | 0.40 | 0.30 | <0.02 | <0.05 | 0.81 | <0.02 | <0.02 | <0.05 | — | bal. |

TABLE 3

| Test Material Symbol | Filler Material | Core Material | Etching | | | | Cold Rolling After Etching | | | Brazeability |
|---|---|---|---|---|---|---|---|---|---|---|
| | | | Acid | Temp (° C.) | Time (sec) | Etching Amount (g/m$^2$) | Thickness Before Rolling (mm) | Rolling Reduction (%) | Thickness After Rolling (mm) | |
| C1 | A2 | B1 | 0.5% hydrofluoric acid | 20 | 60 | 1.00 | 0.65 | 38.5 | 0.40 | B |
| C2 | A3 | B2 | 0.5% hydrofluoric acid | 20 | 60 | 1.17 | 0.65 | 38.5 | 0.40 | B |
| C3 | A3 | B3 | 0.5% hydrofluoric acid | 20 | 60 | 1.04 | 0.65 | 38.5 | 0.40 | A |
| C4 | A1 | B2 | 2% sulfuric acid | 80 | 20 | 0.08 | 0.65 | 38.5 | 0.40 | B |
| C5 | A2 | B1 | 2% sulfuric acid | 80 | 20 | 0.07 | 0.65 | 38.5 | 0.40 | B |
| C6 | A3 | B2 | 2% sulfuric acid | 80 | 20 | 0.05 | 0.65 | 38.5 | 0.40 | B |
| C7 | A3 | B3 | 2% sulfuric acid | 80 | 20 | 0.06 | 0.65 | 38.5 | 0.40 | A |
| C8 | A2 | B1 | 0.5% hydrofluoric acid + 1% nitric acid | 20 | 60 | 1.50 | 0.65 | 38.5 | 0.40 | B |
| C9 | A3 | B2 | 0.5% hydrofluoric acid + 1% nitric acid | 20 | 60 | 1.37 | 0.65 | 38.5 | 0.40 | B |
| C10 | A3 | B3 | 0.5% hydrofluoric acid + 1% nitric acid | 20 | 60 | 1.10 | 0.65 | 38.5 | 0.40 | A |
| C11 | A1 | B2 | 0.1% hydrofluoric acid + 0.17% nitric acid + 1% sulfuric acid | 80 | 10 | 0.62 | 0.65 | 38.5 | 0.40 | B |
| C12 | A2 | B1 | 0.1% hydrofluoric acid + 0.17% nitric acid + 1% sulfuric acid | 80 | 10 | 0.60 | 0.65 | 38.5 | 0.40 | B |
| C13 | A3 | B2 | 0.1% hydrofluoric acid + 0.17% nitric acid + 1% sulfuric acid | 80 | 10 | 0.54 | 0.65 | 38.5 | 0.40 | A |

TABLE 3-continued

| | | | | | | | | Cold Rolling After Etching | | | |
|---|---|---|---|---|---|---|---|---|---|---|---|
| | | | Etching | | | | | Thickness | Rolling | Thickness | |
| Test Material Symbol | Filler Material | Core Material | Acid | Temp (°C.) | Time (sec) | Etching Amount (g/m²) | | Before Rolling (mm) | Reduction (%) | After Rolling (mm) | Brazeability |
| C14 | A3 | B3 | 0.1% hydrofluoric acid + 0.17% nitric acid + 1% sulfuric acid | 80 | 10 | 0.54 | | 0.65 | 38.5 | 0.40 | A |
| C15 | A1 | B2 | 0.5% hydrofluoric acid + 1% nitric acid | 20 | 60 | 1.64 | | | None | | D |
| C16 | A2 | B1 | 0.5% hydrofluoric acid + 1% nitric acid | 20 | 60 | 1.51 | | | None | | D |
| C17 | A3 | B2 | None | | | | | | | | C |

As shown in Table 1 to Table 3, with regard to Test Materials C1-C14, fillets that filled the gap over a long length were formed. As described above, Test Materials C1-C14 were prepared by etching each clad sheet having a thickness of 0.65 mm, after which cold rolling was performed until the thickness became 0.40 mm. Consequently, it is conceivable that excellent results could be obtained owing to the fact that, as described above, multiple fragments of the oxide film, which was fragmented by the cold rolling, were present on the surface of each of these test materials, and the numerous borders between the fragments became the starting points of oxide-film breakdown when the filler material melted, which improved the fluidity of the filler material.

On the other hand, with regard to Test Materials C15-C16, after the thickness of each clad sheet was made to 0.40 mm by cold rolling, etching was performed. Consequently, it is conceivable that excellent results could not be obtained owing to the fact that the oxide film present on the surface of each of these test materials was not fragmented as in Test Materials C1-C14; for example, even though fragile overall, borders between fragments, which tend to become starting points of oxide film breakdown as described above, were not present.

In addition, with regard to Test Material C17, it is conceivable that excellent results could not be obtained owing to the fact that, because etching was not performed in the manufacturing process thereof, a sturdy oxide film, which was formed when hot rolling, etc., was performed, remained, and consequently the breakdown of the oxide film on the filler-material surface was insufficient when the filler material melted.

As a result thereof, it could be understood that Test Materials C1-C14 had brazeability superior to that of Test Materials C15-C17. In addition, with regard to Test Materials C1-C14, degradation in brazeability due to fluctuations in the oxygen concentration and the dew point in the brazing atmosphere could be curtailed more than in Test Materials C15-C17.

Test Example 2

The present example is an example of the situation in which the rolling reduction of the cold rolling was changed. With regard to Test Materials D1-D3 in the present example, other than the changes, as listed in Table 4, to the rolling reduction of the cold rolling performed in the interval from after the hot rolling until the etching was performed and to the rolling reduction of the cold rolling after the etching, Test Materials D1-D3 could be prepared using the same methods as those in Test Example 1. The results of the gap-filling tests for these test materials are listed in Table 4.

TABLE 4

| | | | Cold Rolling Before Etching | | | | | | | Cold Rolling After Etching | | | |
|---|---|---|---|---|---|---|---|---|---|---|---|---|---|
| | | | Thickness | | Thickness | | Etching | | | Thickness | Rolling | Thickness | |
| Test Material Symbol | Filler Material | Core Material | of Clad Sheet (mm) | Rolling Reduction (%) | After Rolling (mm) | Acid | Temp (°C.) | Time (sec) | Etching Amount (g/m²) | Before Rolling (mm) | Reduction (%) | After Rolling (mm) | Brazeability |
| D1 | A3 | B2 | 3.0 | 85.6 | 0.43 | 0.5% hydrofluric acid + 1% nitric acid | 20 | 60 | 1.43 | 0.43 | 7.0 | 0.40 | B |
| D2 | A3 | B2 | 3.0 | 78.3 | 0.65 | 0.5% hydrofluric acid + 1% nitric acid | 20 | 60 | 1.37 | 0.65 | 38.5 | 0.40 | B |
| D3 | A3 | B2 | 3.0 | 46.7 | 1.60 | 0.5% hydrofluric acid + 1% nitric acid | 20 | 60 | 1.51 | 1.6 | 75.0 | 0.40 | B |

As shown in Table 4, with regard to Test Materials D1-D3, the rolling reduction of the cold rolling before the etching was 20% or more, and the rolling reduction of the cold rolling after the etching was 5% or more. In each of these test materials, a fillet that filled the gap over a long length was formed in the gap-filling test. In addition, degradation in brazeability due to fluctuations in the oxygen concentration and the dew point in the brazing atmosphere could be curtailed.

The invention claimed is:

1. A brazing sheet method for brazing an aluminum material in an inert-gas atmosphere without the use of flux, comprising:
    preparing a cladding slab by overlaying a plurality of aluminum slabs that includes a core-material slab composed of an aluminum material and a filler-material slab composed of an Al—Si series alloy, in which a metal element that oxidizes more readily than Al is included in at least one of the slabs;
    preparing a clad sheet, which comprises a core material composed of the core-material slab and a filler material composed of the filler-material slab and disposed on at least one side of the core material, by hot rolling the cladding slab;
    etching a surface of the clad sheet using a liquid etchant that contains an acid; and
    subsequently cold rolling the clad sheet to a desired thickness;
    wherein:
    the aluminum material of the core material comprises 0.81-4.0 mass % Mg; and
    the Al—Si alloy of the filler material comprises less than 0.01 mass % Mg.

2. The brazing sheet manufacturing method according to claim 1, wherein in the etching step, 0.05-2 g/m$^2$ of the clad sheet is etched.

3. The brazing sheet manufacturing method according to claim 1, wherein in the etching step, the liquid etchant contains hydrofluoric acid and an inorganic acid other than hydrofluoric acid.

4. The brazing sheet manufacturing method according to claim 1, wherein after the etching has been performed, the clad sheet is cold rolled to a rolling reduction of 5-80%.

5. The brazing sheet manufacturing method according to claim 1, further comprising:
    between the hot rolling step and the etching step, cold rolling the clad sheet to a rolling reduction of 20% or more.

6. The brazing sheet manufacturing method according to claim 1, wherein in the cold rolling step, the clad sheet is cold rolled to a rolling reduction of 25-75%.

7. The brazing sheet manufacturing method according to claim 6, wherein the liquid etchant contains hydrofluoric acid and an inorganic acid other than hydrofluoric acid.

8. The brazing sheet manufacturing method according to claim 7, further comprising:
    between the hot rolling step and the etching step, cold rolling the clad sheet to a rolling reduction of 20% or more.

9. The brazing sheet manufacturing method according to claim 2, wherein:
    between the hot rolling step and the etching step, the clad sheet is cold rolled to a rolling reduction of 20% or more;
    in the etching step, 0.05-2 g/m$^2$ of the clad sheet is etched; and
    in the cold rolling step after the etching step, the clad sheet is cold rolled to a rolling reduction of 5-80%.

10. A method for manufacturing a brazing sheet, comprising:
    overlaying at least a first layer and a second layer, the first layer being composed of aluminum or an aluminum alloy and the second layer being composed of an Al—Si series alloy, wherein a metal element that oxidizes more readily than Al is contained in at least one of the first and second layers,
    hot rolling the overlaid first and second layers to form a clad sheet;
    etching a surface of the clad sheet using a liquid etchant that contains an acid; and
    subsequently, cold rolling the clad sheet to reduce the thickness of the clad sheet wherein:
    the aluminum material of the first layer comprises 0.81-4.0 mass % Mg; and
    the Al—Si alloy of the second layer comprises less than 0.01 mass % Mg.

11. The method according to claim 10, wherein:
    the metal element that oxidizes more readily than Al is Mg.

12. The method according to claim 11, wherein the second layer contains 6.0-13.0 mass % Si.

13. The method according to claim 12, wherein after the etching has been performed, the clad sheet is cold rolled to a rolling reduction of 5-80%.

14. The method according to claim 13, wherein in the etching step, the liquid etchant contains hydrofluoric acid and an inorganic acid other than hydrofluoric acid.

15. The method according to claim 14, further comprising:
    between the hot rolling step and the etching step, cold rolling the clad sheet to a rolling reduction of 20% or more.

16. The brazing sheet manufacturing method according to claim 9, wherein:
    after the etching has been performed, the clad sheet is cold rolled to a rolling reduction of 5-80%; and
    between the hot rolling step and the etching step, the clad sheet is cold rolled to a rolling reduction of 20% or more.

* * * * *

UNITED STATES PATENT AND TRADEMARK OFFICE
CERTIFICATE OF CORRECTION

| | |
|---|---|
| PATENT NO. | : 11,571,769 B2 |
| APPLICATION NO. | : 17/268283 |
| DATED | : February 7, 2023 |
| INVENTOR(S) | : Yutaka Yanagawa et al. |

It is certified that error appears in the above-identified patent and that said Letters Patent is hereby corrected as shown below:

In the Claims

In Claim 10, Column 22, Line 27, insert a -- ; -- between "clad sheet" and "wherein".

In Claim 16, Column 22, Line 49, replace "claim 9" with -- claim 10 --.

Signed and Sealed this
Thirteenth Day of June, 2023

Katherine Kelly Vidal
*Director of the United States Patent and Trademark Office*